US009505500B2

(12) United States Patent
Vigliotta

(10) Patent No.: US 9,505,500 B2
(45) Date of Patent: Nov. 29, 2016

(54) INERTING FUEL SYSTEMS, METHODS, AND APPARATUSES

(71) Applicant: AMETEK, INC., Berwyn, PA (US)

(72) Inventor: Michael Vigliotta, Plaistow, NH (US)

(73) Assignee: AMETEK, INC., Berwyn, PA (US)

( * ) Notice: Subject to any disclaimer, the term of this patent is extended or adjusted under 35 U.S.C. 154(b) by 0 days.

(21) Appl. No.: 14/603,458

(22) Filed: Jan. 23, 2015

(65) Prior Publication Data

US 2016/0214732 A1   Jul. 28, 2016

(51) Int. Cl.
| | |
|---|---|
| *B01D 53/22* | (2006.01) |
| *B01D 53/30* | (2006.01) |
| *B01D 53/047* | (2006.01) |
| *B64D 37/32* | (2006.01) |

(52) U.S. Cl.
CPC ............ *B64D 37/32* (2013.01); *B01D 53/047* (2013.01); *B01D 53/227* (2013.01); *B01D 53/30* (2013.01)

(58) Field of Classification Search
CPC .... B01D 53/22; B01D 53/227; B01D 53/30; B01D 53/0462; B01D 53/047; B01D 53/0476; B01D 2317/04; B01D 2319/04; B01D 2259/402; B01D 2273/16; B64D 37/32
USPC .......................................................... 95/26
See application file for complete search history.

(56) References Cited

U.S. PATENT DOCUMENTS

| | | | | |
|---|---|---|---|---|
| 4,397,661 | A * | 8/1983 | King .................. | B01D 53/22 55/344 |
| 5,207,806 | A * | 5/1993 | Lagree .............. | B01D 53/0476 95/25 |
| 5,507,855 | A * | 4/1996 | Barry ................. | B01D 53/227 95/12 |
| 7,152,635 | B2 | 12/2006 | Moravec et al. | |
| 7,306,644 | B2 | 12/2007 | Leigh et al. | |
| 7,445,660 | B2 | 11/2008 | Hart et al. | |
| 7,608,131 | B2 | 10/2009 | Jensen | |
| 8,245,978 | B1 | 8/2012 | Beers et al. | |
| 8,801,831 | B1 | 8/2014 | Snow, Jr. et al. | |
| 2001/0003259 | A1 * | 6/2001 | Dolle .................. | B01D 53/227 95/45 |
| 2005/0092177 | A1 * | 5/2005 | Bonchonsky ........ | B01D 53/227 95/138 |
| 2005/0247197 | A1 * | 11/2005 | Snow ................... | B64D 37/32 95/138 |
| 2006/0243133 | A1 * | 11/2006 | Hart .................... | B01D 53/047 95/26 |
| 2007/0054610 | A1 | 3/2007 | Jensen | |
| 2009/0084383 | A1 * | 4/2009 | Maxeiner ............ | B01D 53/22 128/205.12 |
| 2009/0230248 | A1 * | 9/2009 | Byrd .................. | B01D 53/0407 244/135 A |
| 2011/0288184 | A1 * | 11/2011 | Nardo ................ | B01D 53/229 518/702 |
| 2012/0074053 | A1 * | 3/2012 | Collignon ........... | B01D 63/046 210/209 |
| 2012/0145417 | A1 * | 6/2012 | Anselm ............. | B01D 53/0476 169/45 |
| 2015/0314229 | A1 * | 11/2015 | Johnson .............. | B01D 53/22 422/187 |

FOREIGN PATENT DOCUMENTS

WO      2011005946      1/2011

OTHER PUBLICATIONS

International Search Report dated Nov. 5, 2015 in related International Application No. PCT/US2015/046904.
Written Opinion of the International Searching Authority dated Nov. 5, 2015 in related International Application No. PCT/US2015/046904.

* cited by examiner

*Primary Examiner* — Jason M Greene
(74) *Attorney, Agent, or Firm* — RatnerPrestia

(57) ABSTRACT

Inerting fuel systems and methods for inerting fuel tanks are disclosed. An inerting fuel system may include an air inlet passage to receive inlet air, air separation modules to separate oxygen from the inlet air when received, and air separation module valves coupled between the air inlet passage and the air separation modules. The air separation module valves are associated with the air separation modules such that opening of one of the air separation module valves passes a portion of inlet air from the air inlet passage to the air separation module associated with that air separation module valve. A controller selectively opens the air separation module valves such that each of the air separation modules receives a substantially equal level of wear.

15 Claims, 4 Drawing Sheets

INERTING FUEL SYSTEMS, METHODS, AND APPARATUSES

FIELD OF THE INVENTION

The invention relates to inerting fuel systems and, more particularly, to systems, methods, and apparatuses for activating air separation modules in inerting fuel systems.

BACKGROUND OF THE INVENTION

Inerting fuel systems are widely used in airplanes where large amounts of fuel are stored. As fuel is consumed during a flight, the fuel level in the tank is lowered and the remaining oxygen in the tank is replaced by non-flammable inert gas (e.g., nitrogen enriched air) to prevent combustion. During flight, bleed air, which is compressed air taken from the compressor stage of the airplane's engine, is passed through air separation modules (e.g., molecular sieve beds) to produce the nitrogen enriched air. There is a continuing need to efficiently use the air separation modules.

SUMMARY OF THE INVENTION

Aspects of the invention include inerting fuel systems and methods for inerting fuel tanks. Methods for inerting fuel tanks include determining a level of wear for each of a plurality of air separation modules configured to produce nitrogen enriched air, selectively opening each of a plurality of air separation module valves such that each of the plurality of air separation modules has a similar level of wear, and directing the nitrogen enriched air produced by the plurality of air separation modules to a fuel storage tank.

Further aspects of the invention include inerting systems, which may include an air inlet passage configured to receive inlet air, a plurality of air separation modules configured to separate oxygen from the inlet air when received, and a plurality of air separation module valves coupled between the air inlet passage and the plurality of air separation modules. Each of the plurality of air separation module valves is associated with one of the plurality of air separation modules such that opening of one of the air separation module valves passes at least a portion of inlet air from the air inlet passage to the air separation module associated with the one of the air separation module valve. A controller selectively opens each of the plurality of air separation module valves such that each of the plurality of air separation modules receives a substantially equal level of wear.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letters designation may be dropped. Included in the drawings are the following figures.

DETAILED DESCRIPTION OF THE INVENTION

Figure 1:
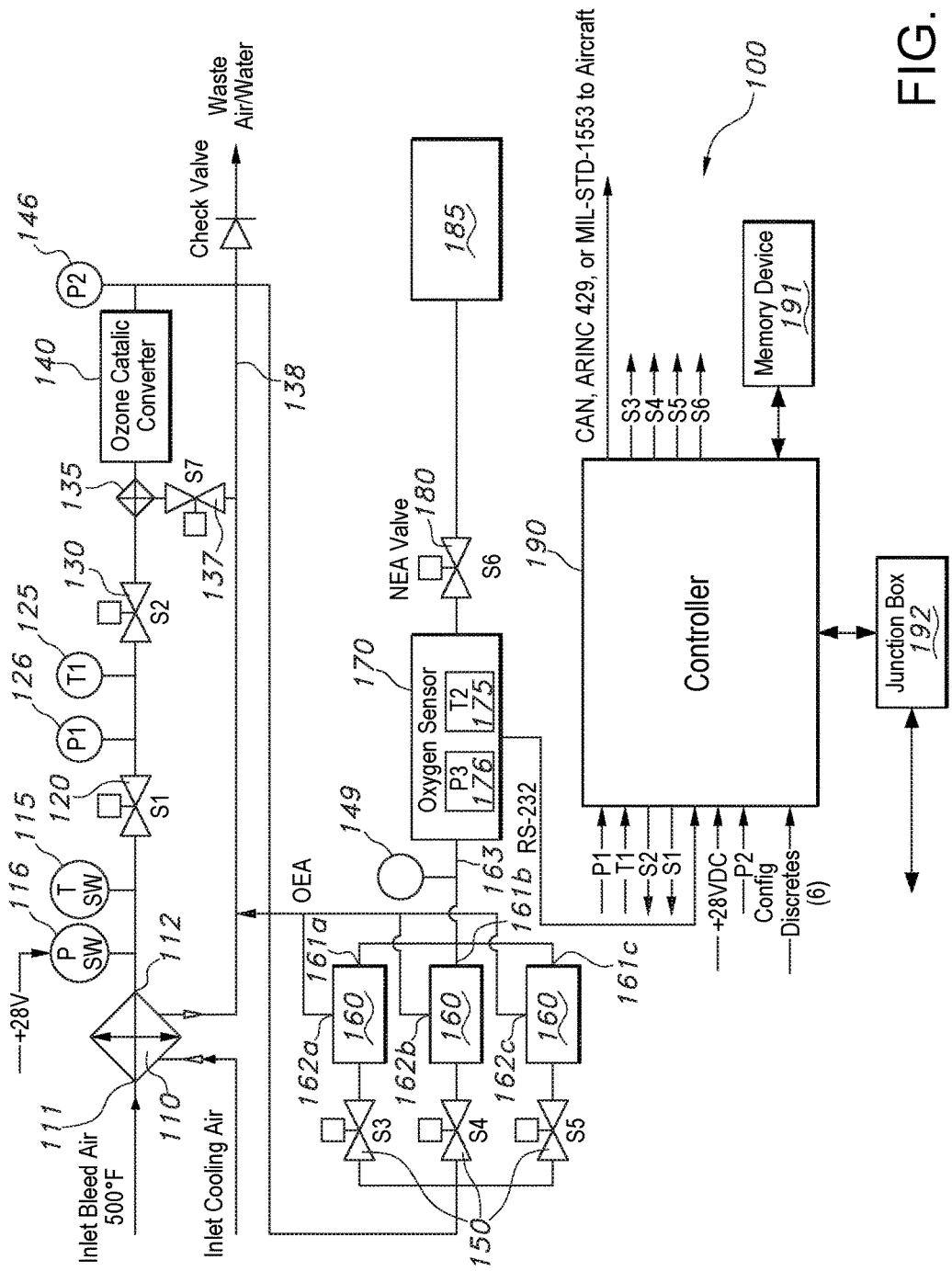
FIG. 1 is a schematic diagram of an inerting fuel system according to aspects of the invention.

FIG. 1 depicts an exemplary system 100 for inerting fuel in accordance with aspects of the invention. As a general overview, system 100 may include a heat exchanger 110, isolation valves 120 and 130, a filter 135, an ozone catalytic converter 140, a plurality of air separation module valves ("ASM valves") 150, a plurality of air separation modules ("ASMs") 160, an oxygen sensor 170, a nitrogen enriched air valve 180, and a controller 190.

The heat exchanger 110 is configured to regulate the temperature and/or pressure of inlet air to achieve a temperature and/or pressure of the inlet air that enables the efficient separation of the inlet air by the ASMs 160. The inlet air may be bleed air obtained from the compressor stage of an airplane's engine. The inlet air enters the heat exchanger 110 through an air inlet passage 111. The heat exchanger 110 may be a shell and tube, double pipe, plate heat exchanger, or other type of heat exchanger that meets the practical aspects of the system 100. In one embodiment, the heat exchanger 110 reduces the temperature of the inlet air from a range of about 500° F. to 1000° F. at the air inlet passage 111 to a range of about 158° F. to about 200° F. as measured at an air outlet passage 112 of the heat exchanger 110. The heat exchanger 110 coolant may be air or other fluid typically used for cooling.

Although the description herein is directed primarily to embodiments where the inlet air is bleed air obtained from the compressor stage of an airplane's engine, it is contemplated that other sources of air, such as ambient air, may be used. As used herein, the term "inlet air" is meant to cover these other sources of air. Suitable techniques for regulating these other sources of air will be understood by one of skill in the art from the description herein. For example, where the inlet air is ambient air, the ambient air may be pressurized and/or heated, e.g. by a compressor and/or heat exchanger, to achieve a pressure and/or temperature that enables efficient air separation by a plurality of ASMs 160.

A first isolation valve 120 may be used to protect downstream components from excessive and/or not suitable temperature and/or pressure. A temperature switch 115 and pressure switch 116 may be utilized to control the first isolation valve 120 based on the temperature and/or pressure of the inlet air upstream from the first isolation valve 120. If the temperature and pressure of the inlet air are suitable, then valve 120 is opened. If the temperature and/or pressure are not suitable (e.g., may damage components of system 100), the valve 120 may be used to restrict (e.g., reduce or stop) inlet air flow.

System 100 may also include a second isolation valve 130 controlled by the controller 190. The valve 130 may also protect the system 100 from inlet air that has a temperature and/or pressure that is not suitable for the system 100. To determine the temperature and pressure, a first temperature sensor 125 and a first pressure sensor 126 may be located upstream from the valve 130. The controller 190 may then control valve 130 based on the temperature and/or pressure determined by temperature sensor 125 and/or pressure sensor 126 to prevent excessive and/or not suitable pressure and/or temperature from damaging downstream components.

A filter 135 may be employed to reduce the amount of particles and/or the amount of water molecules in the inlet air. For example, a filter having a pore size of 0.1 microns may be utilized to remove particles having a size greater than 0.1 microns, which could damage the ASMs 160. One method for determining when to replace the filter 135 is to calculate the pressure drop across the filter 135. Pursuant to this method, the first pressure sensor 126 and a second pressure sensor 146 may be utilized by the controller 190 to determine the pressure drop across filter 135. The controller 190 may then compare the pressure drop to a threshold value, e.g., two (2) to four (4) times its nominal value, to determine if the filter 135 needs to be purged and/or replaced.

A drain valve 137 may be used to siphon off undesirable substances, byproducts, and/or materials from the inlet air into a waste stream 138. For example, particles removed from the inlet air by the filter 135 may be purged and disposed of through the waste stream 138 by way of the drain valve 137. To facilitate disposal, the waste stream 138 may be under vacuum pressure or the undesirable substances, byproducts, and/or materials may be pressurized from upstream.

An ozone catalytic converter 140 may be incorporated into the system 100 to protect components that can be damaged by ozone molecules.

The illustrated system includes a first ASM 160*a*, a second ASM 160*b*, and a third ASM 160*c*. Each ASM 160 is configured to separate oxygen from a portion of an inlet air received to produce nitrogen enriched air. As used herein, a portion of inlet air is used to refer to part (e.g., twenty-five percent, a third, a half, two-thirds, etc.) or all of the inlet air received by each of the plurality of ASMs 160. The plurality of ASMs 160 may comprise membranes and/or fibers constructed from polymers, ceramics, or other selectively porous materials. Alternatively, methods for ionizing air molecules or utilizing chemical processes may be implemented into system 100 to produce nitrogen enriched air streams 163 and/or oxygen depleted air streams. In one embodiment, the ASMs 160 are molecular sieve beds. Suitable ASMs 160 will be understood by one of skill in the art from the description herein.

The illustrated system 100 includes a first ASM valve 150*a*, a second ASM valve 150*b*, and a third ASM valve 150*c*. Each ASM valve 150 is associated with one of the ASMs 160. For example, ASM valve 150*a* is associated with ASM 160*a*, ASM valve 150*b* is associated with ASM 160*b*, and ASM valve 150*c* is associated with ASM 160*c*. The ASM valves 150, under control of the controller 190, regulate the portion of the inlet air directed to each of the ASMs 160. Although three ASM valves 150 and associated ASMs 160 are depicted, fewer or more ASM valves 150 and/or ASMs 160 may be employed.

Each illustrated ASM 160 has a nitrogen enriched air outlet 161 and a nitrogen depleted air outlet 162. When an ASM 160 is active (e.g., has inlet air flowing through it), a steam of nitrogen enriched air 163 that may be directed into a fuel storage tank 185 is produced as well as a stream of nitrogen depleted air that may be disposed of by way the waste stream 138.

An oxygen sensor 170 may be used to test the nitrogen enriched air stream 163, which includes a combination of the nitrogen enriched streams from outlets 161*a*, 161*b*, and/or 161*c*. The oxygen sensor 170 senses the amount of oxygen in the nitrogen enriched air stream 163. Alternatively (or additionally), a nitrogen sensor may be employed to sense the amount of nitrogen in the nitrogen enriched air stream 163.

The oxygen sensor 170 may contain a second temperature sensor 175 and/or a third pressure sensor 176. One method for determining when to replace each of the plurality of ASMs 160 is to calculate the pressure drop across each ASM 160. For example, pressure sensors 146 and 176 may be utilized by the controller 190 to determine the pressure drop across ASM 160*a*, 160*b*, and/or 160*c*. When the pressure drop exceeds a predefined threshold, e.g., two (2) to four (4) times its nominal value, the controller 190 may identify the ASMs 160 for replacement and produce a signal indicating that the ASMs 160 should be replaced.

A nitrogen enriched air valve 180 may be used to regulate the flow of nitrogen enriched air stream 163 to a fuel storage tank 185. In one embodiment, the nitrogen enriched air valve 180 is designed to prevent the nitrogen enriched air steam 163 from flowing to the fuel storage tank 185, e.g., if the concentration of oxygen in the nitrogen enriched air stream 163 is too great. In another embodiment, the nitrogen enriched air valve 180 prevents or restricts the nitrogen enriched air stream 163 if the temperature and/or pressure is unsuitable.

The system 100 contains a controller 190 coupled to components of the system 100. The controller 190 may be configured to sense data from temperature and/or pressure sensors 115, 116, 125, 126, 146, 175, and/or 176, control the valves 130, 137, 150, and/or 180, and determine when the ASMs 160 should be replaced. The controller 190 may be a microprocessor that receives data from various components and/or sensors of the system 100 and controls the valves based on the sensed data. Additionally, the controller 190 may be configured to carry out one or more of the other functions described herein. The controller 190 may be connected to a junction box 192 for the convenience of installing and using the system 100. In one embodiment, the controller 190 executes performance tests on components of the device. These performance tests include connectivity, accuracy, precision, and other tests relevant to the respective component. Suitable controllers 190 for use with system 100 will be understood by one of skill in the art from the description herein.

The controller 190 is coupled to memory device 191. Controller 190 is configured to write information to and receive information from memory device 191. Instructions for configuring the controller 190 to perform one or more of the functions described herein may be stored in memory device 191. Additionally, controller 190 may store in memory device 191 one or more parameters necessary for implementing the functions described herein. Memory device 191 may include one or more memory device components including non-volatile and/or volatile memory. Suitable memory devices 191 will be understood by one of skill in the art from the description herein. Although illustrated as a separate component, memory device 191 (or a portion thereof) may be integrated into controller 190.

The controller 190 may be configured to execute wear leveling algorithms. Wear leveling algorithms increase the efficiency of system 100 by improving upon the utilization and replacement of the plurality of ASMs 160. Wear leveling algorithms enable the controller 190 to regulate the level of wear (also described herein as "wear leveling") received by each ASM 160. The level of wear received by an ASM 160 is indicative of the amount of degradation of the ASM 160 and/or provides an indication of how soon the ASM 160 will need to be replaced. The wear leveling algorithms enable the controller 190 to regulate the ASMs 160 by selectively activating each ASM 160a, 160b, and/or 160c based upon the level of wear for each of the ASMs 160a, 160b, and/or 160c so that the plurality of ASMs 160 receives a substantially equal level of wear. Thus, in one example, utilization of the wear leveling algorithms in system 100 enables uniform wear across the ASMs 160 so that replacement of the ASMs 160 may occur at the same time. This decreases the cost of maintenance and increases the amount of time the system 100 is operational.

A controller 190 implementing the wear leveling algorithms may determine the level of wear for each ASM 160 based on the amount of time each ASM 160 is active, the intensity of the portion of inlet air received by each ASM 160, and/or the pressure drop across each ASM 160. The amount of active time for each ASM 160 may be determined by the wear leveling algorithms based on data regarding the amount of time the associated ASM valve 150 was open. The wear leveling algorithms may determine the intensity of the portion of inlet air received by the ASM 160 based on data regarding the pressure of the inlet air received by the ASM 160 and/or the flow rate of the inlet air through the ASM 160 as sensed by pressure sensors 146 and/or 176 and/or a flow rate sensor 149. The wear leveling algorithms may also employ data regarding the pressure drop across each ASM 160. Based on the received data, the wear leveling algorithms enable the controller 190 to determine the level of wear for each ASM 160 and subsequently send signals to activate the ASM 160 having the least level of wear. In the illustrated system 100, the controller 190 opens the ASM valve 150 associated with the ASM 160 with the least level of wear. The controller 190 will periodically or continuously determine the level of wear for each ASM 160 using the wear leveling algorithms. The frequency at which the controller 190 determines the level of wear may depend on the flight plan and/or flight regiment, e.g., the controller 190 may utilize the wear leveling algorithms more frequently while the plane is cruising. For example, while the plane is ascending, typically all of the ASMs 160 are active; thus the controller 190 may not need to utilize the wear leveling algorithms to determine which ASMs 160 to activate and/or deactivate.

By way of example, the controller 190 may utilize the wear leveling algorithms to identify the ASM 160 with the least level of wear and activate the ASMs 160, as needed, based on the level of wear. For example, if the first ASM 160a has the least level of wear, the controller 190 will send signals to open the first ASM valve 150a to activate the first ASM 160a when an ASM 160 is needed. If more nitrogen enriched air is required from system 100, the controller 190 will identify the ASM 160b or 160c with the next least level of wear. If the second ASM 160b has the next least level of wear, then the controller 190 may send signals to open the second ASM valve 150b to activate the second ASM 160b. The controller 190 may substitute one ASM 160 for another to maintain a substantially equal level of wear among the ASMs 160. For example, if after a predetermined amount of time the controller 190 utilizes the wear leveling algorithms and determines that the third ASM 160c now has the least level of wear, the controller 190 may send signals to close the ASM valve 150 associated with the ASM 160 having the greatest level of wear to deactivate the ASM 160 with the greatest level of wear and open the third ASM valve 150c to activate the third ASM 160c. In this example, the controller 190 periodically determines the level of wear using wear leveling algorithms. This illustrative process is repeated to achieve substantially equal wear among the plurality of ASMs 160. A substantially equal level of wear is defined herein to mean a difference in level of wear among the ASMs 160 that does not exceed ten (10) percent.

Figure 2A:
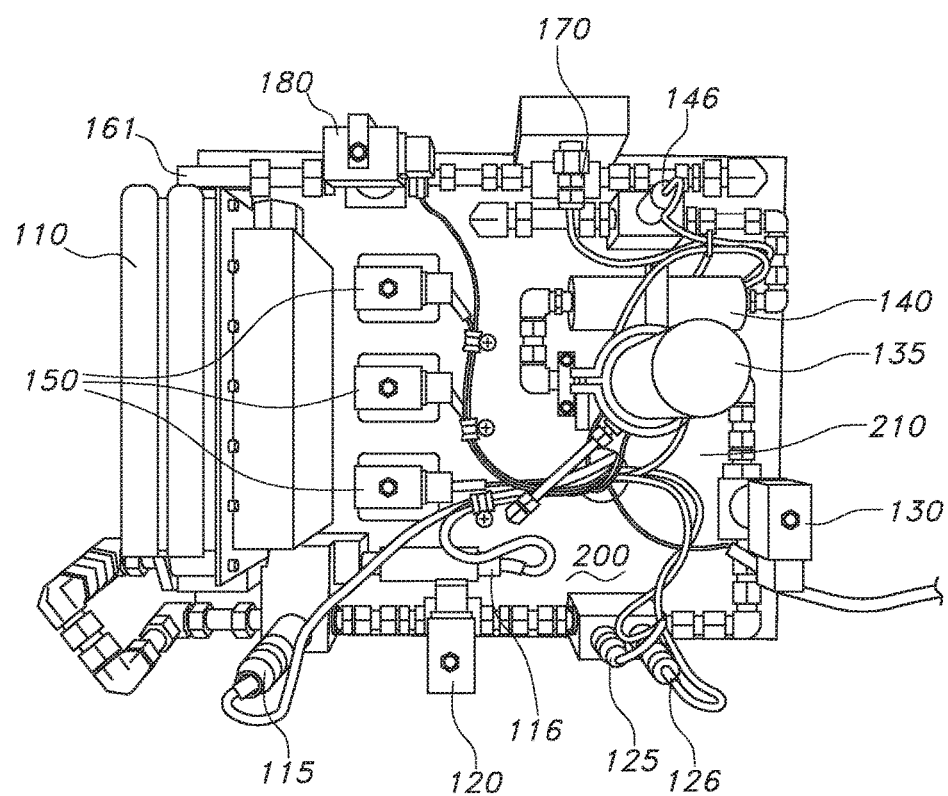
FIG. 2a is a front-side view of an implementation of an inerting fuel system according to aspects of the invention.
Figure 2B:
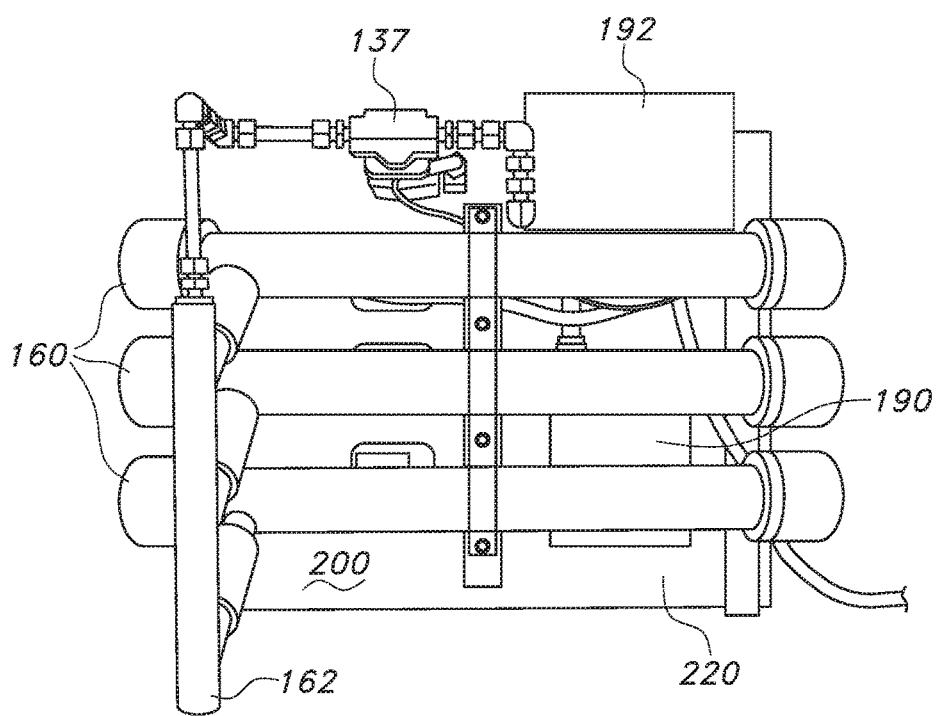
FIG. 2b is a back-side view of an implementation of an inerting fuel system according to aspects of the invention.

FIG. 2a and FIG. 2b illustrate one implementation of the inerting fuel system 100 in accordance with aspects of the invention. This implementation is particularly well-suited for large, commercial or military airplanes, including passenger airplanes and cargo airplanes, which contain vacant spaces suitable for this implementation of system 100. Suitable implementations configured to fit in smaller planes, such as military fighter planes, would be understood by a person of ordinary skill in the art from the description herein. The inerting fuel system 100 is affixed to a mounting plate 200. FIG. 2a illustrates a first side 210 of the mounting plate 200 and FIG. 2b illustrates a second side 220 of the mounting plate 200.

A heat exchanger 110 is mounted on the first side 210 of the mounting plate 200. The heat exchanger 110 is connected by a pipe to a first isolation valve 120. Further, a temperature switch 115 senses the inlet air upstream from the isolation valve 120 and controls the valve 120 by sending a signal through a wire to valve 120. Additionally and independently, on the first side 210 of the mounting plate 200, a pressure switch 116 senses the inlet air upstream from the isolation valve 120 and controls the valve 120 by sending a signal through a wire to valve 120.

The first isolation valve 120 is connected to a second isolation valve 130 by way of a pipe located on the first side 210 of the mounting plate 200. The second isolation valve 130 is controlled by a controller 190, which may send signals to valve 130 directly through wires and/or by way of an intermediary junction box 192. The controller 190 receives data regarding the temperature and pressure of the inlet air upstream from valve 130 from a temperature sensor 125 and a pressure sensor 126, located on the first side 210 of the mounting plate 200.

Also, on the first side 210 of the mounting plate 200, a filter 135 is connected to the second isolation valve 130 by way of a pipe. The filter 135 is further connected by pipes to an ozone catalytic converter 140, located on the first side 210 of the mounting plate 200, and a drain valve 137, located on the second side 220 of the mounting plate 200. When the drain valve 137 is closed, the inlet air passes through the filter 135 to the ozone catalytic converter 140. When the drain valve 137 is opened, water and/or particles are purged from the filter 135 and disposed of through a pipe containing the waste stream 138.

An ozone catalytic converter 140 is positioned on the first side 210 of the mounting plate 200 to remove ozone from the inlet air. The ozone catalytic converter 140 is connected by a pipe to the plurality of ASM valves 150. A second pressure sensor 146, located on the first side 210 of the mounting plate 200, senses the pressure of the inlet air traveling from the catalytic converter 140 to the plurality of ASM valves 150. The pressure sensor 146 sends data regarding the inlet air's pressure through wires to the controller 190.

A first ASM valve 150a, a second ASM valve 150b, and a third ASM valve 150c are positioned on the first side 210 of the mounting plate 200. The controller 190 can open each ASM valve 150, e.g., by sending signals through wires to each ASM valve 150.

A first ASM 160a, a second ASM 160b, and a third ASM 160c are mounted to the second side 220 of the mounting plate 200 (FIG. 2b). The controller 190 may activate an ASM 160 by sending a signal to open the associated ASM valve 150.

A nitrogen enriched air valve 180 is located on the first side 210 of the mounting plate 200. The nitrogen enriched air valve 180 can restrict or prevent nitrogen enriched air received from at least one of the ASMs 160, through a network of pipes, from flowing to the fuel storage tank 185. An oxygen sensor 170 may be mounted on the first side 210 of the mounting plate 200 to sense the air flowing through the nitrogen enriched air stream 163 to the nitrogen enriched valve 180. Although not seen in FIG. 2a, oxygen sensor 170 may contain a temperature sensor 175 and/or pressure sensor 176. The oxygen sensor 170 sends signals to the controller 190 regarding the nitrogen enriched air in stream 163. The controller 190 may then control the nitrogen enriched air valve 180 to regulate the amount of nitrogen enriched air flowing to the fuel storage tank 185.

The controller 190 is mounted on the second side 220 of the mounting plate 200 (FIG. 2b). The junction box 192 is also mounted on the second side 220 of the mounting plate 200.

Figure 3:
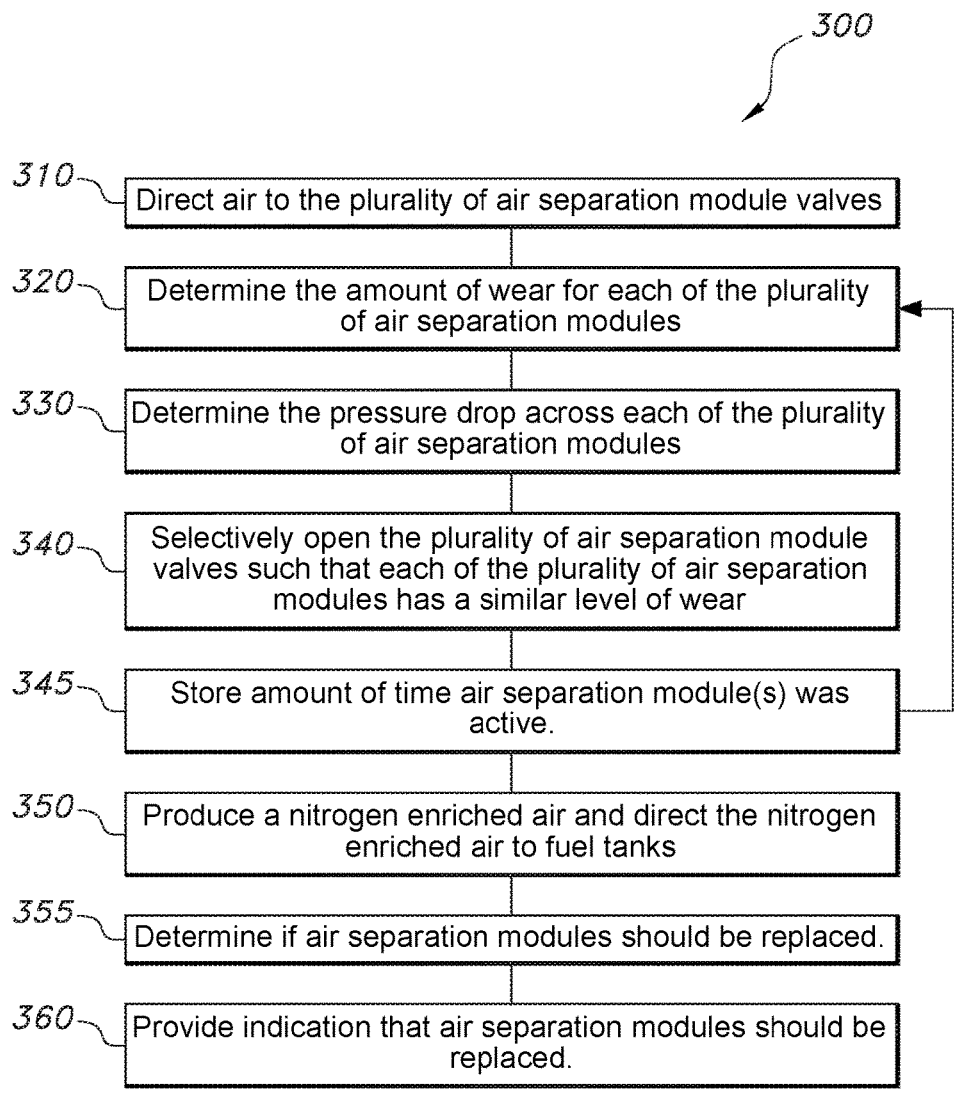
FIG. 3 is a flow chart depicting a method for inerting a fuel according to aspects of the invention.

FIG. 3 illustrates an exemplary method 300 for inerting fuel. The method 300 is described with reference to the inerting fuel system 100 to facilitate description. Other suitable inerting fuel systems will be understood by one of skill in the art from the description herein.

In step 310, inlet air is directed to the plurality of ASM valves 150. The inlet air may be bleed air from the compressor stage of an airplane's engine. The inlet air may be regulated prior to reaching the plurality of ASM valves 150. The inlet air may be regulated, for example, to change the temperature and/or pressure by way of a heat exchanger 110, to remove particulate and/or moisture by way of a filter 135, and/or to remove ozone by way of an ozone catalytic converter 140. Isolation valves 120 and/or 130 may be utilized to regulate the inlet air's flow downstream, e.g., to protect components of the system 100 that may be damaged by unrestricted inlet air flow.

In step 320, the level of wear is determined for each of the ASMs 160. The controller 190 may determine the level of wear for each ASM 160 by retrieving a level of wear for each ASM 160 from memory. The level of wear may be based on the amount of time each of the ASMs 160 was active. The amount of time each ASM 160 was active (or the associated ASM valve 150 was open) may be stored in memory device 191 for retrieval by the controller 190. Optionally, intensity (e.g., pressure) of portions of inlet air received by each ASM 160 and/or pressure drop across each ASM 160 may also be considered. Intensity may be considered by applying a weight factor to portions of the amount of time an ASM 160 was active. For example, if a portion of inlet air received by an ASM 160 had a relatively high intensity, that portion of inlet air may be weighted by a multiplying weight factor (e.g., 1.3). On the other hand, if a portion of inlet air received by an ASM 160 had a relatively low intensity, that portion of inlet air may be weighted by another weight factor (e.g., 0.8). The weighted amount of active time is referred to herein as an effective use. The intensity of the portions of inlet air received by the ASM 160 may be based on data received from a flow rate sensor 149.

In step 330, the pressure drop across the ASMs 160 is determined. The pressure drop may be determined for one or more ASMs 160, for example, whenever the controller 190 determines the level of wear of an ASM 160, periodically (e.g., every 15, 35, 50 minutes, etc.), or every time there is a change in active ASMs 160. The controller 190 may determine the pressure drop across the ASMs 160 by processing data received from a pressure sensor 146 located upstream from the plurality of ASMs 160 and from a pressure sensor 176 located downstream from the plurality of ASMs 160. The placement of the pressure sensors may enable the controller 190 to determinate the pressure drop across each ASM 160. In one embodiment, the controller 190 compares the pressure drop across the ASMs 160 to a threshold value to determine if the ASMs 160 need replacement. The controller 190 may determine the pressure drop for the ASMs 160 that are currently active. If only one ASM 160 is active, the pressure drop across that ASM 160 may be compared to an ASM 160 pressure drop threshold value for a single ASM 160. If two ASMs 160 are active, the pressure drop across the two active ASMs 160 may be compared to an ASM 160 pressure drop threshold value for two ASMs 160, e.g., double the pressure drop threshold value for a single ASM 160. If three ASMs 160 are active, the pressure drop across the three active ASMs 160 may be compared to an ASM 160 pressure drop threshold value for three ASMs 160, e.g., triple the pressure drop threshold value for a single ASM 160.

In step 340, the ASM valves 150 are selectively opened by the controller 190. The controller 190 may selectively open the ASM valves 150 using a wear leveling algorithm applied to the level of wear associated with each ASM 160. The level of wear may be based solely on the amount of time each ASM 160 is active or may additionally be based on other factors such as the intensity of air received by an ASM 160 and/or a recent pressure drop reading across an ASM 160. ASM valves 150 may be opened and/or closed to selectively activate and/or deactivate specific ASMs 160 when another ASM 160 is needed or an active ASM 160 is no longer necessary. Additionally, ASM valves 150 may be opened and/or closed to substitute one ASM 160 for another if a particular ASM 160 has been active for a relatively long period of time (e.g., an hour). By way of example, when nitrogen enriched air is needed, the controller 190 may determine the ASM 160 having the least level of wear and selectively open the ASM valve 150 associated with the ASM 160 having the least level of wear to pass inlet air to that ASM 160 (i.e., activating that ASM 160).

In an embodiment, step 340 is performed during predefined flight regiments (i.e., during cruise) in which less than all ASMs 160 are required (e.g., only one ASM 160) to provide and maintain inerting of the plane's fuel storage tank(s) 185. When all ASMs 160 are required (e.g., during ground, ascent, and descent), wear leveling may be suspended until less than all ASMs 160 are required as wear will be uniform.

In step 345, the active time of each ASM 160 is recorded. The controller 190 may record in memory device 191 the active time of an ASM 160 when it is deactivated (e.g., when its associated ASM valve 150 is turned off). Optionally, the controller 190 may additionally record the intensity level of the air flow during the portion of time when the ASM 160 was active.

In an embodiment, the controller 190 repeats steps 320, 330, 340, and 345, until the need for nitrogen enriched air has ceased. The controller 190 may repeat such steps periodically (e.g., every few minutes, hours, etc.) or substantially continuously. It is contemplated that step 330 may be performed independent from steps 320, 340, and 345 and/or at a different rate.

In step 350, nitrogen enriched air is directed to the fuel storage tank 185, e.g., to replace the volume of spent fuel in order to reduce the risk of combustion in the fuel storage tank 185. An oxygen sensor 170, containing a third pressure sensor 176 and/or a second temperature sensor 175, may be employed to sense the nitrogen enriched air produced by the ASMs 160. The oxygen sensor 170 communicates data to the controller 190 regarding the sensed nitrogen enriched air. A nitrogen enriched air valve 180 may be employed downstream from the oxygen sensor 170. Based on the data received from the oxygen sensor 170, the controller 190 may control the nitrogen enriched air valve 180 to regulate the flow of nitrogen enriched air to the fuel storage tank 185.

In step 355, controller 190 determines whether ASMs 160 should be replaced. In one example, controller 190 determines whether ASMs 160 should be replaced based on a comparison of their level of wear (e.g., as determined above in step 320) to a threshold value. For example, the controller 190 may determine that the ASMs 160 should be replaced when the level of wear of any one ASM 160 exceeds 100 hours of effective use. As described above, the level of wear may be an actual amount of time as modified by intensity and/or pressure drop. In another example, controller 190 determines whether the ASMs 160 should be replaced based on a comparison of pressure drop across the active ASM(s) 160 (e.g., as determined above in step 320) to a threshold value. For example, the controller 190 may determine that the ASMs 160 should be replaced when the pressure drop of any one ASM 160 (or any group of ASMs 160) exceeds a manufacturer's specification.

In step 360, the controller 190 provides an indication that the ASMs 160 should be replaced based on the determination made in step 355. For example, the controller 190 may generate a signal that illuminates an indicator in a cockpit of an airplane.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for producing nitrogen enriched air to inert fuel in a fuel storage tank, the system comprising:
   an air inlet passage configured to receive inlet air;
   a plurality of air separation modules configured to separate oxygen from the inlet air when received to produce nitrogen enriched air;
   a plurality of air separation module valves coupled between the air inlet passage and the plurality of air separation modules, each of the plurality of air separation module valves associated with one of the plurality of air separation modules such that opening of one of the air separation module valves passes at least a portion of inlet air from the air inlet passage to the air separation module associated with the one of the air separation module valves; and
   a controller coupled to each of the plurality of air separation module valves, the controller configured to determine a level of wear for each of the plurality of air separation modules and selectively open each of the plurality of air separation module valves such that the level of wear for each of the plurality of air separation modules is substantially equal.

2. The system of claim 1, further comprising a first pressure sensor configured to detect pressure upstream of the plurality of air separation modules and a second pressure sensor configured to detect pressure downstream of the plurality of air separation modules; and
   wherein the controller is coupled to the first pressure sensor and the second pressure sensor and is further configured to detect a pressure drop over at least one of the plurality of air separation modules based on a difference between pressure detected at the first pressure sensor and pressure detected at the second pressure sensor.

3. The system of claim 2, wherein the controller is further configured to determine that one or more of the plurality of air separation modules needs replacement when the pressure drop exceeds a replacement threshold value.

4. The system of claim 1, wherein the controller is further configured to determine that one or more of the plurality of air separation modules needs replacement when the amount of time open for the one or more of the plurality of air separation module valves exceeds a threshold value.

5. The system of claim 1, wherein the controller is further configured to determine the level of wear one of the plurality of air separation module receives based on the amount of time the one air separation module receives the portion of inlet air.

6. The system of claim 1, wherein the controller is further configured to determine the level of wear one of the plurality of air separation module receives based on the intensity of the portion of inlet air received by the air separation modules.

7. The system of claim 1, wherein the plurality of air separation modules is coupled to the fuel storage tank and wherein the plurality of air separation modules provides nitrogen enriched air at a rate corresponding to the rate of fuel being removed from the fuel storage tank.

8. A method for inerting fuel, comprising:
   associating each of a plurality of air separation module valves to one of a plurality of air separation modules, the air separation modules being configured to separate oxygen from a portion of inlet air when active to produce nitrogen enriched air;
   passing the portion of inlet air from an inlet air passage to the plurality of air separation module valves;
   determining a level of wear for each of the plurality of air separation modules;
   selectively opening each of the plurality of air separation module valves based on the determined level of wear such that the level of wear for each of the plurality of air separation modules is substantially equal; and
   directing the nitrogen enriched air produced by the plurality of air separation modules to a fuel storage tank.

9. A method for inerting fuel, comprising:
   determining a level of wear for each of a plurality of air separation modules configured to produce nitrogen enriched air;
   selectively opening each of a plurality of air separation module valves such that each of the plurality of air separation modules has a similar level of wear; and
   directing the nitrogen enriched air produced by the plurality of air separation modules to a fuel storage tank.

10. The method of claim 9, further comprising:
    determining a pressure drop across at least one of the plurality of air separation modules by detecting a pressure upstream of the plurality of air separation modules and detecting a pressure downstream of the plurality of air separation modules; and
    identifying at least one of the plurality of air separation modules for replacement when the pressure drop exceeds a threshold value.

11. The method of claim 9, wherein the determining step comprises determining the level of wear for one or more of the plurality of air separation modules based on the amount of time the one or more air separation modules receives the portion of inlet air.

12. The method of claim 9, wherein the determining step comprises determining the level of wear for one or more of the plurality of air separation modules based on the intensity of the portion of inlet air received by the one or more air separation modules.

13. The method of claim 8, further comprising:
   determining a pressure drop across at least one of the plurality of air separation modules by detecting a pressure upstream of the plurality of air separation modules and detecting a pressure downstream of the plurality of air separation modules; and
   identifying at least one of the plurality of air separation modules for replacement when the pressure drop exceeds a threshold value.

14. The method of claim 8, wherein the determining step comprises determining the level of wear for one or more of the plurality of air separation modules based on the amount of time the one or more air separation modules receives the portion of inlet air.

15. The method of claim 8, wherein the determining step comprises determining the level of wear for one or more of the plurality of air separation modules based on the intensity of the portion of inlet air received by the one or more air separation modules.

* * * * *